United States Patent
McDonnell et al.

(10) Patent No.: US 6,771,669 B1
(45) Date of Patent: Aug. 3, 2004

(54) METHOD AND APPARATUS FOR REMOTE MEMORY CLOCK SYNCHRONIZATION FOR OPTIMIZED LEADOFF PERFORMANCE

(75) Inventors: David J. McDonnell, Fair Oaks, CA (US); Himanshu Sinha, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,458

(22) Filed: Dec. 30, 1999

(51) Int. Cl.[7] ................................................ H04J 3/06
(52) U.S. Cl. ...................... 370/503; 370/517; 375/354; 327/141
(58) Field of Search ................................ 370/503, 516, 370/517, 518, 519, 520; 375/354, 355, 356, 371–377; 365/189.01, 191, 194; 327/141, 144, 162; 710/58, 60, 61; 711/100, 200, 104, 105

(56) References Cited

U.S. PATENT DOCUMENTS 6,128,749 A * 10/2000 McDonnell et al. ........ 713/600
6,396,887 B1 * 5/2002 Ware et al. ................. 375/354
6,449,679 B2 * 9/2002 Ryan .......................... 710/315

OTHER PUBLICATIONS

Intel, Intel 82805AA Memory Translator Hub (MTH) Datasheet, pp. 1–50, Nov. 1999.*
Rambus Technology Overview, Feb. 12, 1999, 14 pages.
Rambus Technology Overview, Aug. 23, 1999, 15 pages.
Rambus "Advance Information", Direct RDRAM data sheet, Oct. 2, 1997, 48 pages.
MICRON, "Synchronous Dram Module", SDRAM DIMMs, 4,8 Meg. x 64 data sheet, 17 pages.
MICRON, "Technical Note" TN–48–03, High Performance With SDRAM Modules, 6 pages.
MICRON, "Technical Note" TN–48–01, R–M–W Cycles With SDRAMs, 3 pages.
IBM MicroNews, "SyncCHRONOUS DRAMs: The DRAM of the Future," Jan. 1996, 3 pages.
"JEDEC SDRAM", http://www.tomshardware.com/guides/ram/index8.html, Oct. 24, 1998, 4 pages.

* cited by examiner

*Primary Examiner*—Frank Duong
(74) *Attorney, Agent, or Firm*—Dennis A. Nicholls

(57) ABSTRACT

A method and apparatus for synchronizing a synchronizing clock is disclosed for use in synchronizing a high-speed memory bus with a second, heritage memory bus. This method and apparatus includes generating an initial synchronizing clock from a reference clock of the high-speed memory bus. It then includes receiving a synchronizing packet on the high-speed memory bus utilizing the initial synchronizing clock. Finally, it includes delaying a clock transition of the initial synchronizing clock in response to the received data of the synchronizing packet.

25 Claims, 15 Drawing Sheets

Sclk PLL loses lock temporarily (a few us) when Synclk is stretched. Note however that the actual beat relationship between Synclk and Sclk should remain unaffected.

US 6,771,669 B1

METHOD AND APPARATUS FOR REMOTE MEMORY CLOCK SYNCHRONIZATION FOR OPTIMIZED LEADOFF PERFORMANCE

FIELD OF THE INVENTION

The present invention relates to dynamic random access memory, and, more specifically, to connecting heritage dynamic random access memory in a high-speed dynamic random access memory environment.

BACKGROUND

Dynamic random access memory (DRAM) is a general-purpose high-performance memory device suitable for use in a broad range of applications. DRAM allows high bandwidth for multiple, simultaneous, randomly addressed memory transactions. Many kinds of DRAM have been utilized, such as fast page mode (FPM) DRAM, extended data output (EDO) DRAM, synchronous DRAM (SDRAM), and Rambus® DRAM (RDRAM). Newer kinds of DRAM, such as RDRAM, typically have better performance than earlier kinds of DRAM, such as EDO DRAM. Earlier kinds of DRAM with respect to the age of a given computer system may be referred to as heritage DRAM with respect to that computer system. Hence the use of the newer kinds of DRAM is generally preferred over the use of heritage DRAM in computer systems.

A chipset for implementing the functions of a motherboard in a computer system may interface with a preferred type of DRAM, typically a high-speed DRAM, but may also contain compatibility circuitry for allowing the use of heritage DRAM. For example, a chipset for a personal computer motherboard may have optimal performance with SDRAM but may also include circuitry to interface with heritage DRAM types such as FPM DRAM. Reasons for including compatibility circuitry for heritage DRAM may include the fact that a customer may already have large stocks of heritage DRAM in inventory or that temporary shortages of the preferred memory type may exist in the marketplace.

Among the highest-speed memory performances currently available utilize RDRAM. The RDRAM is a synchronous DRAM operating in data packet mode at very high clock rates (e.g. at 400 MHz), and transfers data on both falling and rising edges of the RDRAM clock (e.g. at 800 MHz). With respect to processors utilizing RDRAM, normal SDRAM is a heritage DRAM type. For various reasons, including those given above, it may be advantageous to provide an interface for SDRAM in a primarily RDRAM motherboard environment.

Earlier motherboards could readily accommodate SDRAM, EDO DRAM, and FPM DRAM because of similarities in clocking and data presentation. However, RDRAM differs from SDRAM in clock rate and phase, data packet configuration, and signaling logic levels. Utilizing large amounts of buffering memory would be inefficient and costly.

SUMMARY OF THE INVENTION

A method and apparatus for synchronizing a synchronizing clock is disclosed. This method and apparatus includes generating an initial synchronizing clock from a reference clock. It then includes receiving a synchronizing packet utilizing the initial synchronizing clock. Finally, it includes delaying a clock transition of the initial synchronizing clock in response to received data of the synchronizing packet.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for synchronizing heritage dynamic random access memory (DRAM) in a Rambus® DRAM (RDRAM) memory system is described. The exemplary heritage synchronous DRAM (SDRAM) is connected to the Rambus channel by a memory translator hub (MTH) circuit. In one embodiment, packets of control information or data sent from a system memory controller to the MTH may utilize a pair of system clocks, one inside the memory controller and the other inside the MTH. Each of the system clocks is generated by dividing down a high-speed master clock. However, upon power-up, each of the two system clocks may begin with random phase when compared with the other. In one embodiment of the present invention, a special packet of control information, transmitted using the system clock of the memory controller, is received by the MTH. The magnitude of the phase shift with respect to the current phase of the MTH is detected, and a series of phase stall pulses synchronize the MTH system clock to the memory controller system clock. Synchronizing the MTH system clock to the memory controller system clock allows a reduced latency period, thus improving performance and simplifying the implementation of the memory controller and other system circuits.

Figure 1:
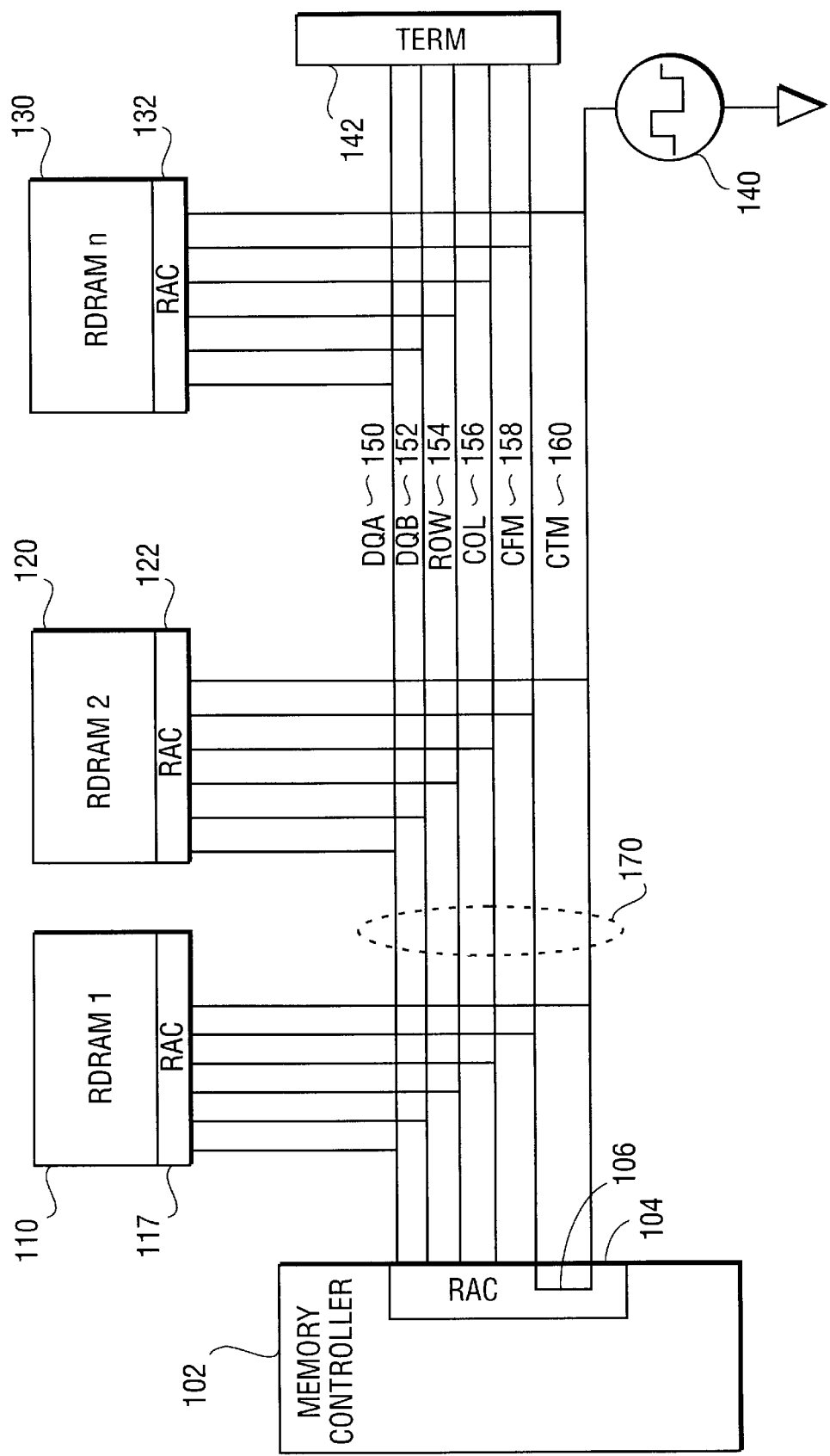
FIG. 1 is a block diagram of a Rambus® dynamic random access memory (RDRAM) module memory system.

Referring now to FIG. 1, a block diagram of a Rambus® dynamic random access memory (RDRAM) module memory system is shown. In the FIG. 1 embodiment, the memory controller 102 and RDRAM modules RDRAM 1 110, RDRAM 2 120, and RDRAM n 130 are connected via a high-speed memory bus called a Rambus channel 170. The memory controller 102 may be connected to a microprocessor or other data processor (not shown).

The Rambus channel 170 is electrically implemented using a form of digital logic levels called Rambus signaling level (RSL). The voltage of each RSL signal line swings between approximately 1.0 volts and 1.8 volts, and each RSL signal line is implemented as a differential pair. The RSL lines are electronically terminated at terminator 142. Data is transferred over the DQA 150 and DQB 152 lines, each of which contain 9 individual signals and are therefore 9 bits wide to accommodate a byte of data plus an error correction bit. Control information is transferred over the ROW 154 and COL 156 lines, where there are 3 ROW 154 lines and 5 COL 156 lines. The ROW 154 lines and COL 156 lines are sometimes referred to together as the RQ lines.

Clocking in the Rambus channel 170 is performed by a 400 MHz clock. Because of the high data rate, this 400 MHz clock is generated at the remote end of the Rambus channel 170 by clock generator 140 and then transmitted in the direction of the memory controller 102 as the signal "clock to master" (CTM) 160. Once CTM 160 reaches memory controller 102, it is sent via a loop connection 106 back down the Rambus channel 170 as signal "clock from master" (CFM) 158. The various RDRAM modules may adjust their internal timing to compensate for their physical distance from memory controller 102 by examining the clock skew (phase shift and duty-cycle shift) between CTM 160 and CFM 158.

Each connection to the Rambus channel 170 may be by means of an interface circuit called a Rambus application specific integrated circuit (ASIC) cell (RAC). RAC 104, RAC 112, RAC 122, and RAC 132 of FIG. 1 may perform similar functions but may be implemented by circuits of differing design. In general, each RAC performs various serial to parallel conversions to move data and control information off of and onto the highly multiplexed Rambus channel 170.

The Rambus channel 170 transfers both data and command information in packet form. The packets are clocked by CTM 160/CFM 158 on both the falling and rising edges, giving a data transfer rate of 800 MHz. Typical data and information packets are transferred on 4 sequential CTM 160/CFM 158 clock cycles and thus contain 8 sequential transfers.

Figure 2:
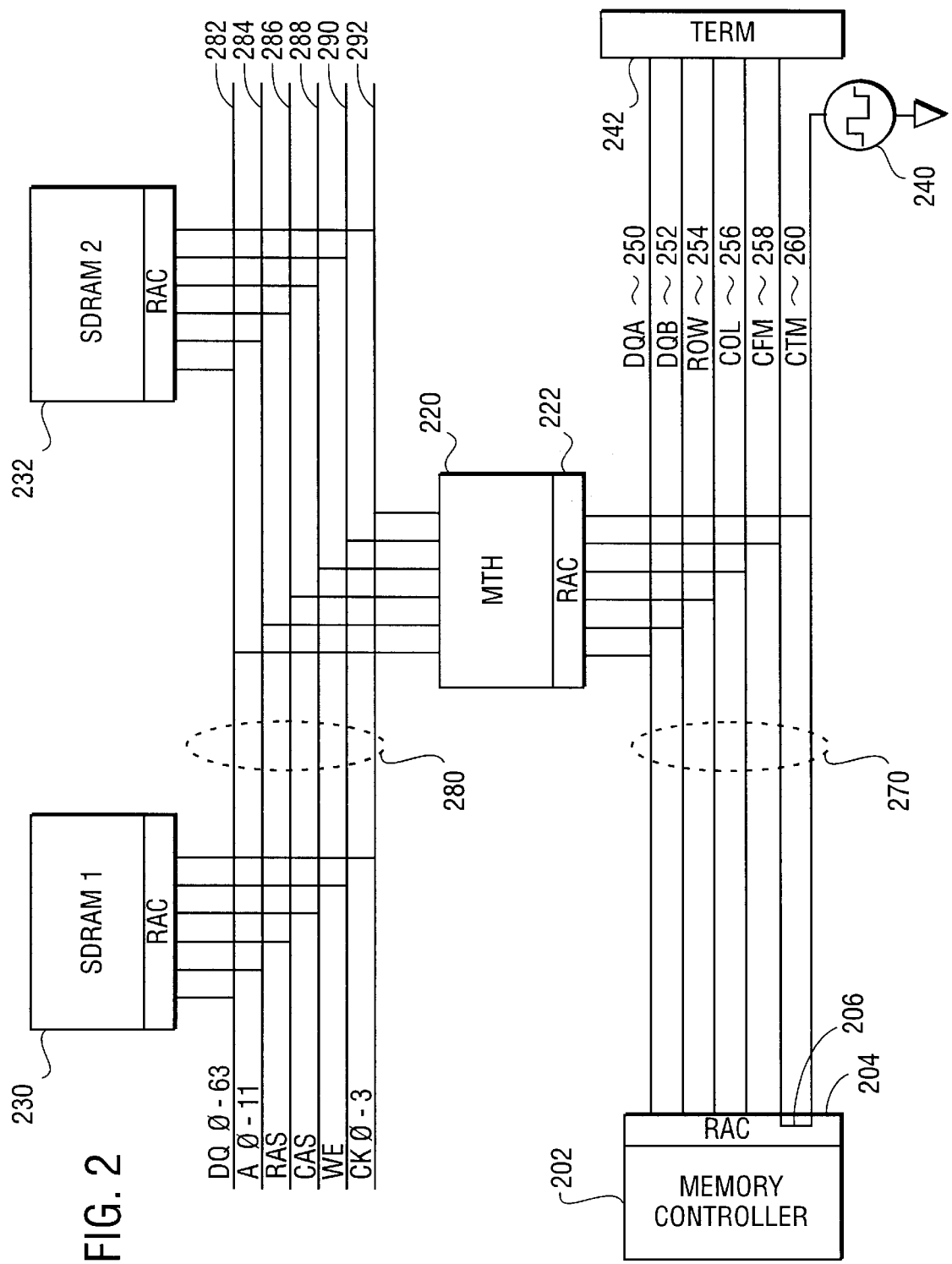
FIG. 2 is a block diagram of an RDRAM module memory system including a memory translation hub (MTH), according to one embodiment of the present invention.

Referring now to FIG. 2, a block diagram of an RDRAM module memory system including a memory translation hub (MTH) is shown, according to one embodiment of the present invention. Rambus channel 270 includes a memory controller 202 and supports an MTH 220. The MTH 220 is connected to Rambus channel 270 via an MTH RAC 222, and may additionally be connected to SDRAM 1 230 and SDRAM 2 232 via DRAM bus 280. The FIG. 2 embodiment shows exemplary SDRAM attached to DRAM bus 280, but in other embodiments fast page mode (FPM) DRAM or extended data output (EDO) DRAM may be supported by DRAM bus 280.

The MTH 220 may be designed to emulate an RDRAM module. However, in the FIG. 2 embodiment, the functions of interfacing with SDRAM may be divided between memory controller 202 and MTH 220. The MTH 220 may be a simpler device which performs the electrical signal level translations between RSL logic levels of Rambus channel 270 and the low-voltage transistor-transistor logic (LVTTL) logic levels of DRAM bus 280.

MTH 220 may also perform the conversion of data packets on the Rambus channel 270 into wide-words on the DRAM bus 280. In one embodiment, MTH 220 receives data packets of eight eight-bit bytes each on the DQA 250 or DQB 252 lines of Rambus channel 270, and converts these into a single sixty-four-bit wide word for transmission on the DQ 282 lines of the DRAM bus 280. In alternate embodiments, the packets may be converted into a single seventy-two-bit wide word.

In the case of control information, MTH 220 may receive control information packets, called memory control packets (MCP), of four eight-bit bytes on the ROW 254 and COL 256 lines. The MTH 220 may then decode these MCP into the proper timing signals on the address A 284, row-access-strobes RAS 286, column-access-strobes CAS 288, and writeenables WE 290 signal lines of DRAM bus 280. The task of properly formatting the MCP so that the MTH 220 may easily decode them is, in one embodiment, performed by the memory controller 202. Thus the MTH 220 and the memory controller 202 jointly perform the format changes required so that the SDRAM attached to the DRAM bus 280 may operate properly in response to signals on the Rambus channel 270.

Figure 3:
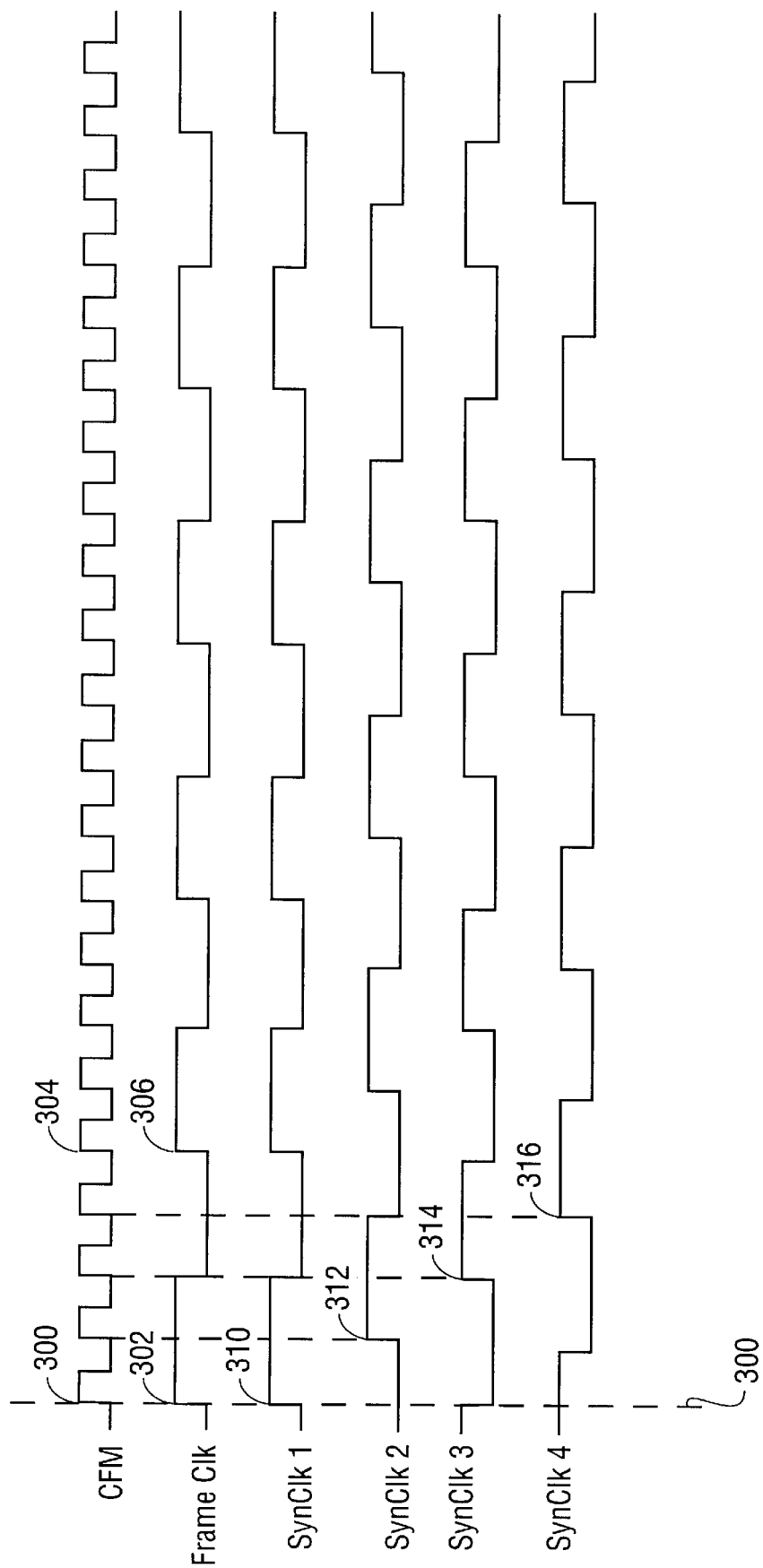
FIG. 3 is a timing diagram of power-up phase differences of system clocks, according to one embodiment of the present invention.

Referring now to FIG. 3, a timing diagram of power-up phase differences of system clocks is shown, according to one embodiment of the present invention. It is possible to utilize CTM 160/CFM 158 as a reference clock for the entire FIG. 2 system. As mentioned above in connection with FIG. 1, the data packets of Rambus channel 170 are transferred in groups of eight eight-bit bytes on a series of eight rising and falling edges of CTM 160/CFM 158. These eight rising and falling edges occupy four clock periods of CTM 160/CFM 158. In order to frame these data packets, in one embodiment memory controller 102 may utilize a framing clock, FrameClk, that is generated internally to memory controller 102 by digitally dividing CFM 158 by four. In the FIG. 3 example, CFM 158 and FrameClk have been running for some indeterminate amount of time after power-on. When CFM 158 has a rising edge 300, FrameClk starts dividing and therefore also has a rising edge 302. In the FIG. 3 example, after two clock cycles of CFM 158 the FrameClk has a falling edge. When CFM 158 next has a rising edge after four clock cycles 304, FrameClk begins another cycle with rising edge 306.

When an MTH such as MTH 220 of FIG. 2 is used, receiving the data packets of Rambus channel 270 requires another clock, a synchronizing clock, internal to MTH 220 for the purpose of minimizing data packet reception latency through the MTH 220. (The packets contain an embedded start flag so that they may be received without this synchronizing clock, but this would increase potential latency.) This synchronizing clock, called SynClk of MTH 220, may be used to convert the 400 MHz CTM 160/CFM 158 into a clock synchronized at 100 MHz for clocking 100 MHz SDRAM modules. This is shown in the FIG. 3 embodiment, in which CFM 258 is digitally divided by four to generate SynClk. In other embodiments, CTM/CFM may be at another frequency other than 400 MHz, such as 300 MHz, and the SynClk may be at another frequency other than 100 MHz, such as 133 MHz. The present invention encompasses these alternate frequency embodiments.

Each time the memory system of FIG. 2 is powered on, the generators of FrameClk and SynClk within memory controller 202 and MTH 220, respectively, may become active at different points in time. For this reason, even though the FrameClk and SynClk of FIG. 3 are both 100 MHz clocks synchronized with CFM 158, SynClk may vary in phase in one of four relations with FrameClk. FIG. 3 illustrates four phase relations of SynClk: SynClk1, SynClk2, SynClk3, and SynClk4.

SynClk1 demonstrates when the SynClk generator begins operation at the same time (or at a multiple of 4 CFM clock cycles later or earlier) as the FrameClk generator. Using modulo arithmetic terminology, SynClk1 occurs when the SynClk generator begins operation after the same number, modulo 4, of CFM clocks as the FrameClk generator. A rising edge 302 of FrameClk occurs simultaneously with a rising edge 310 of Synclk1. In other power on situations, SynClk2 occurs when the SynClk generator begins operation at one CFM cycle, modulo 4, later than the FrameClk generator; SynClk3 occurs when the SynClk generator begins operation at two CFM cycles, modulo 4, later than the FrameClk generator; and SynClk4 occurs when the SynClk generator begins operation at three CFM cycle, modulo 4, later than the FrameClk generator. The equivalent SynClk2 rising edge 312, SynClk3 rising edge 314, and SynClk4 rising edge 316 are one, two, or three CFM clock cycles after a corresponding rising edge 302 of FrameClk.

Figure 4:
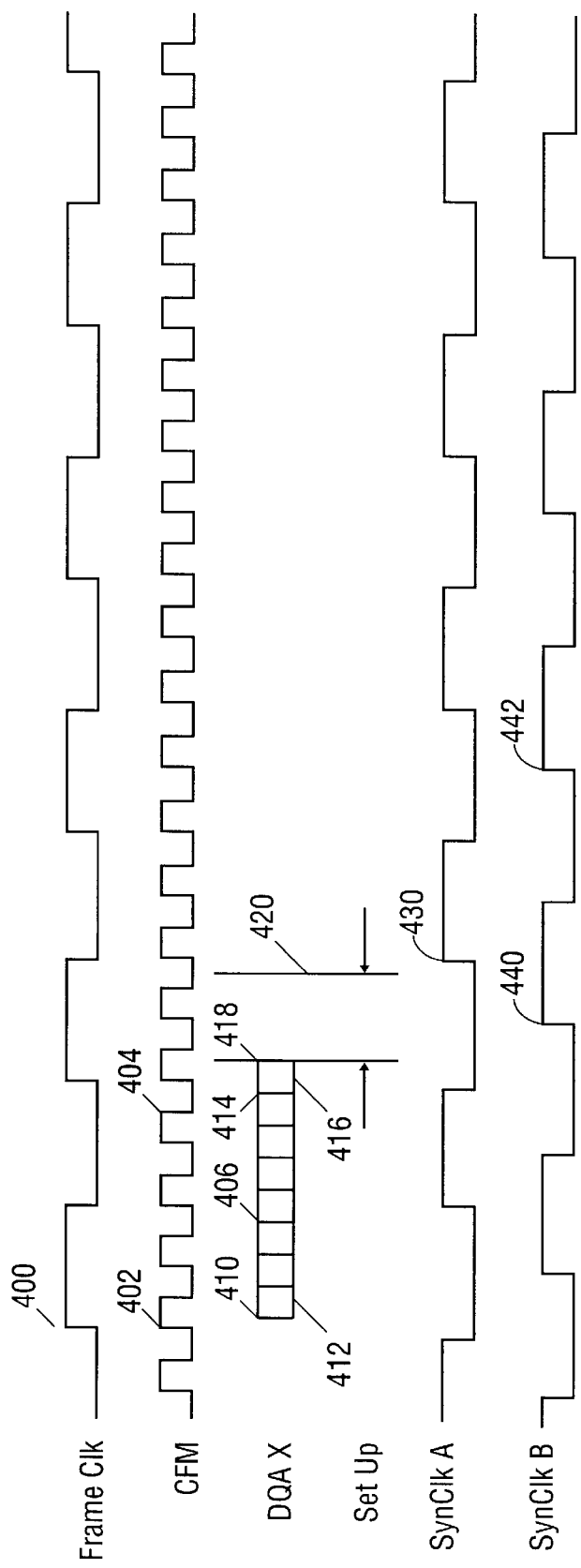
FIG. 4 is a timing diagram showing set-up timing for SDRAM access, according to one embodiment of the present invention.

Referring now to FIG. 4, a timing diagram showing set-up timing for SDRAM access is shown, according to one embodiment of the present invention. The clock SynClk may be used by MTH 220 not only for framing the receipt of data or control information from memory controller 202, but also may be used as the indirect source of the clocks CK 292 for interfacing with the SDRAM modules. In one embodiment, the clocks CK 292 are generated by a phase locked loop (PLL) which uses SynClk as an input timing reference. In order to minimize data buffer requirements within MTH 220, and also minimize time latency through MTH 220, the clocks CK 292 should transition as closely as possible to the receipt of the final data or command information word of a Rambus channel 270 packet. However, once the data or command information received by MTH 220, there is a minimal setup time, Tsu, during which the DRAM DQ lines 282, A lines 284, RAS 286, CAS 288, and WE 290 make their transitions and become stable for data transfers. Thus the soonest that CK 292 should make its rising edge transition is the end of the received data or command information packet plus Tsu.

An exemplary data packet 406 is shown being sent over Rambus channel 270, where a single exemplary data line DQAX is shown for clarity. The transfer of data packet 406 is initiated by rising edge 400 of FrameCLk, corresponding to rising edge 402 of CFM. Beginning a short time later at time 410, a bit 412 of the first byte of data packet 406 becomes valid. The other bits of the data packet 406 become valid at the subsequent rising and falling edges of CFM. The bit 416 of the last byte of data packet 406 becomes valid at time 414 after falling edge 404 of CFM. At time 418, the packet has been received by MTH 220. The setup time Tsu, from time 418 to time 420, accommodates the output delay of the RAC 222 of MTH 220, other internal delays in MTH 220, and any DRAM setup time. The actual transfer of data on the DRAM bus 280 is clocked by the CK signals 292. The CK signals 292 depend from SynClk because SynClk is used as a timing reference input to PLL which generates the CK signals 292. When rising edges of SynClk are used for timing, a SynClk rising edge occurring subsequent to time 420 allows proper SDRAM interfacing. (In other embodiments a falling edge of SynClk may be used for timing.)

However, as shown above in connection with FIG. 3, SynClk may occupy one of four phases with respect to FrameClk after initial power application. In one exemplary occurrence, SynClkA has a rising edge 430 minimally subsequent in time to the end of the setup time Tsu 420. Rising edge 430 would be an appropriate timing signal for transferring the data of exemplary data packet 406 over DRAM bus 280. However, another exemplary occurrence of SynClk, SynClkB, may not be an appropriate timing signal.

The rising edge 440 closest in time to the time 420 arrives too early for use as rising edge 440 occurs prior to the end of setup time Tsu 420. The subsequent rising edge 442 of SynClkB occurs significantly later than the end of setup time Tsu 420. Hence the circuitry of MTH 220 must not only accommodate various setup times Tsu but also varying initial phases of SynClk.

Figure 5:
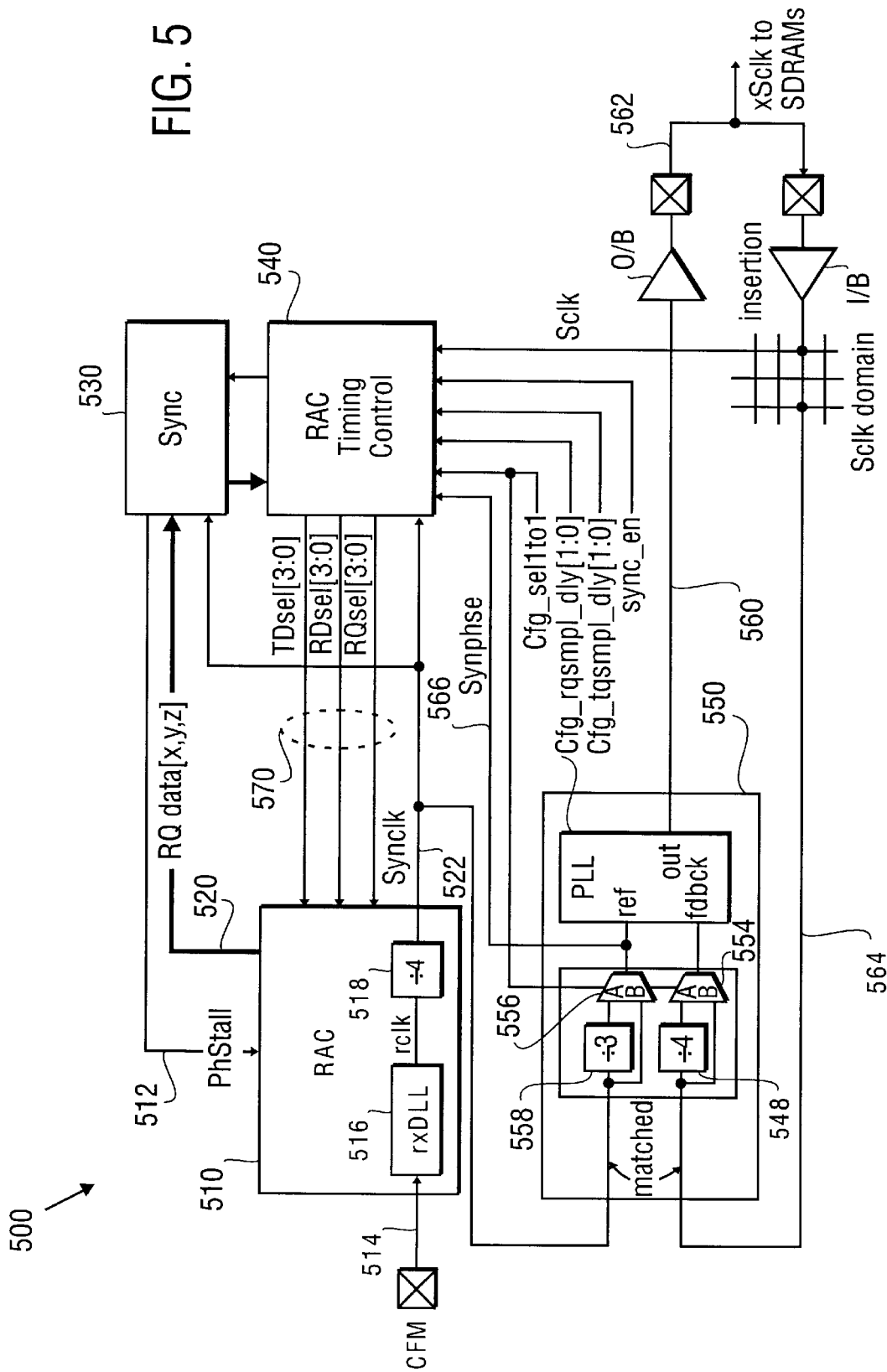
FIG. 5 is a block diagram of the MTH of FIG. 2, according to one embodiment of the present invention.

Referring now to FIG. 5, a block diagram of the MTH of FIG. 2 is shown, according to one embodiment of the present invention. Major components of MTH 500 include Rambus application-specific integrated circuit (ASIC) cell (RAC) 510, synchronizer 530, RAC timing control 540, and PLL circuit 550. The MTH 500 performs an overall conversion of the RSL signals of the Rambus channel 270 into the LVTTL signals of DRAM bus 280.

RAC 510 converts the RSL signals of the Rambus channel 270 into complementary metal-oxide-semiconductor (CMOS) signals for use within MTH 500. Additionally RAC 510 converts the Rambus packets into 64-bit wide words of DRAM bus 280.

Synchronizer 530 examines the initial phase relationship of SynClk 522 with special memory control packets (MCP) called sync MCPs. These sync MCPs are transmitted by the memory controller 202 to the MTH 500 after the Rambus channel 270 and RAC 510 of MTH 500 are operational, but before normal data and control information transfers on Rambus channel 270 begins. In one embodiment, the sync MCP may be sent on a single signal path of ROW 254 or COL 256, and will be a pattern of all "1" bits. In other embodiments, the sync MCP may be on any combination of recognizable bits on either the ROW 254, COL 256, DQA 250, or DQB 252 signal lines of Rambus channel 270. On the basis of the measured relationship synchronizer 530 may assert pulses on the phase stall (PhStall) signal line 512. The operation of synchronizer 530 will be discussed in greater detail below.

A phase locked loop (PLL) circuit 550 is used to phase lock the SynClk of the RAC 510 with the transmit Sclk 562 used to clock the SDRAMs connected to DRAM bus 280. PLL circuit 550 includes the PLL 552 proper, a pair of dividers 548, 558, and associated multiplexors 554, 556. The dividers 548, 558 and multiplexors 554, 556 allow the MTH 500 to selectably configure the frequency of the DRAM channel 280 to be 100 MHz or 133 MHz using a Rambus channel 270 frequency of 400 MHz or 300 MHz. Any combination of these frequencies may be chosen in the MTH 500 embodiment. In other embodiments, other combinations of bus clock frequencies may be chosen.

RAC timing control 540 takes the SynClk 522 and Sclk 564, and reference signals from synchronizer 530, and uses them to generate receive and transmit sampling control signals 570 used by the RAC 510.

Figure 6:
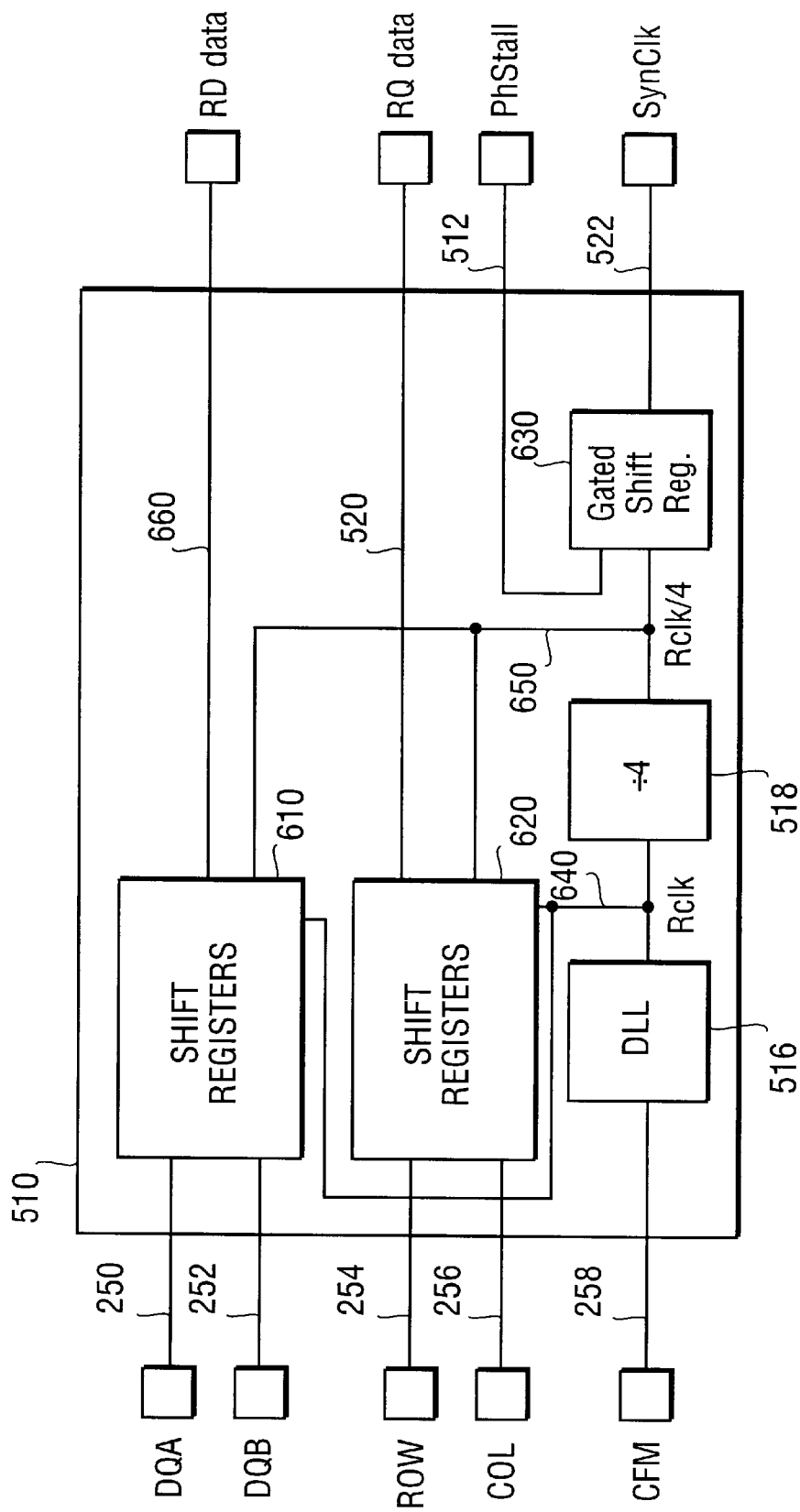
FIG. 6 is a block diagram of the Rambus application-specific integrated circuit (ASIC) cell (RAC) of the MTH of FIG. 5, according to one embodiment of the present invention.
Figure 7A:
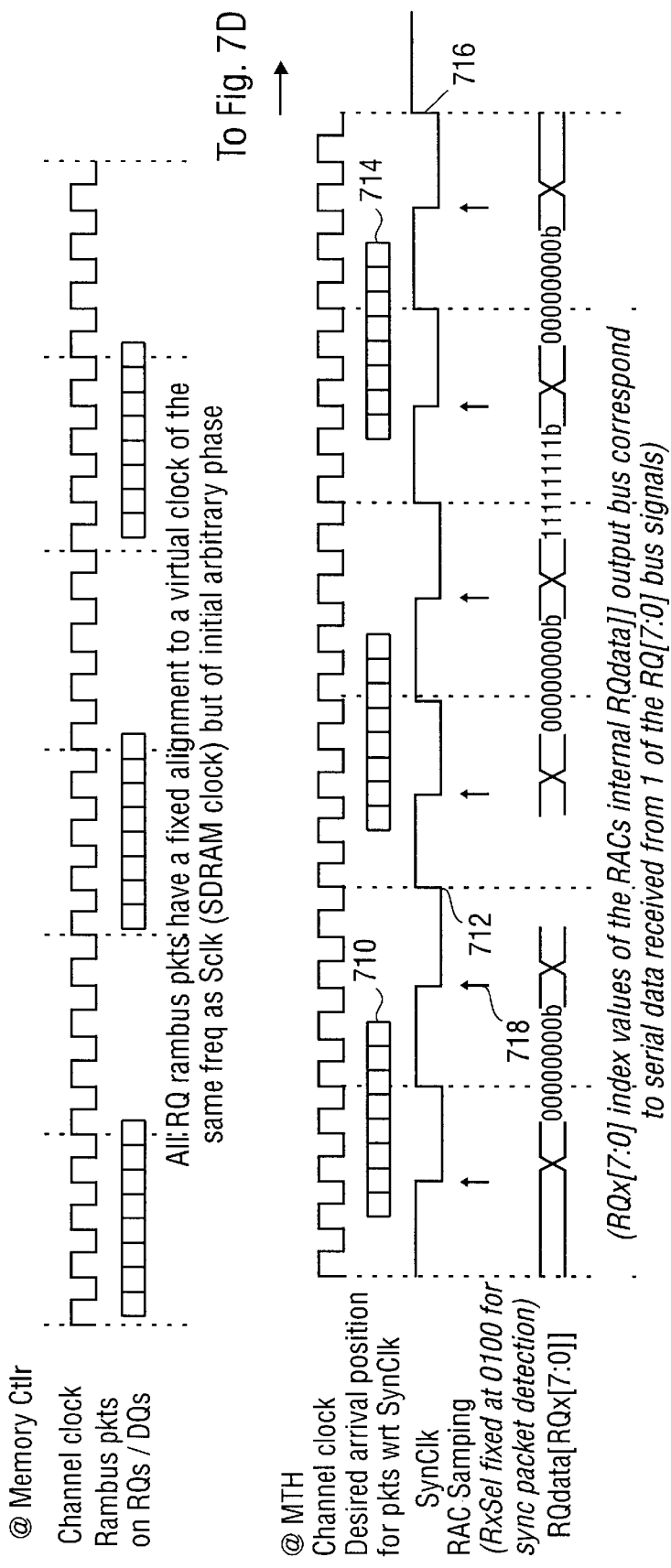
FIG. 7 is a timing diagram of clocks of the MTH of FIG. 2, according to one embodiment of the present invention.
Figure 7B:
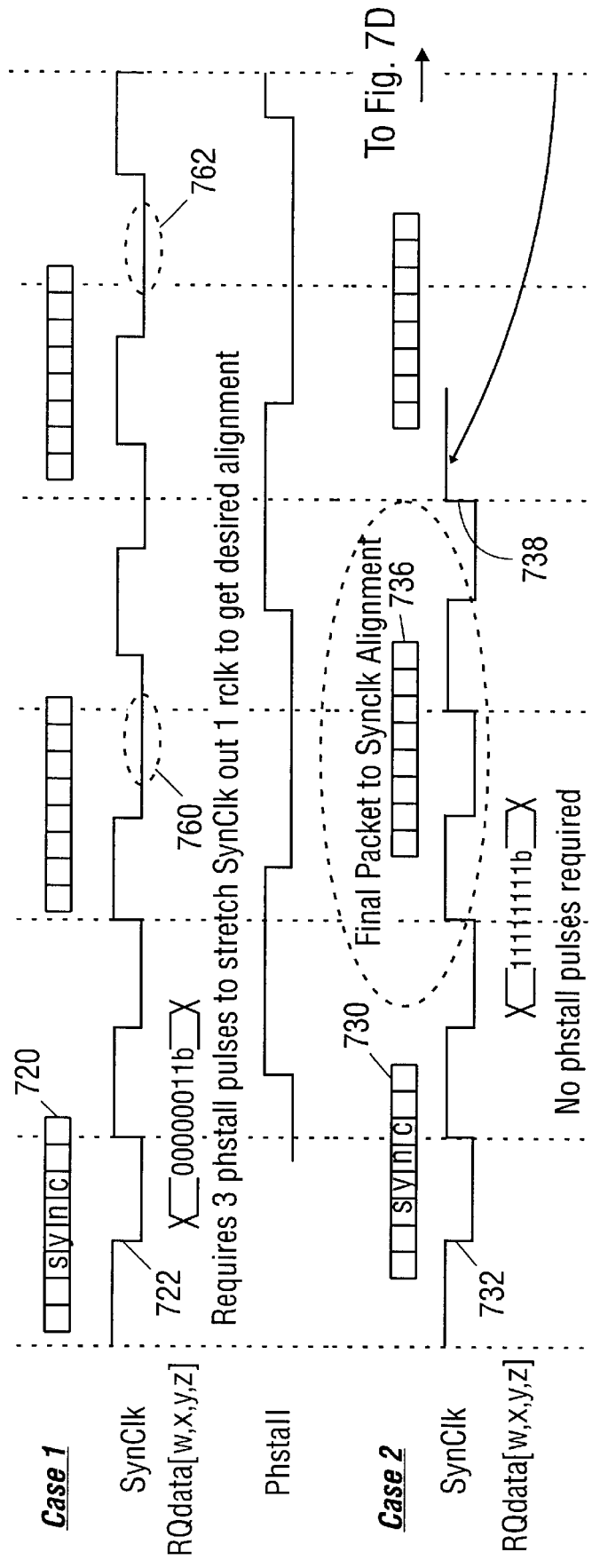
Figure 7C:
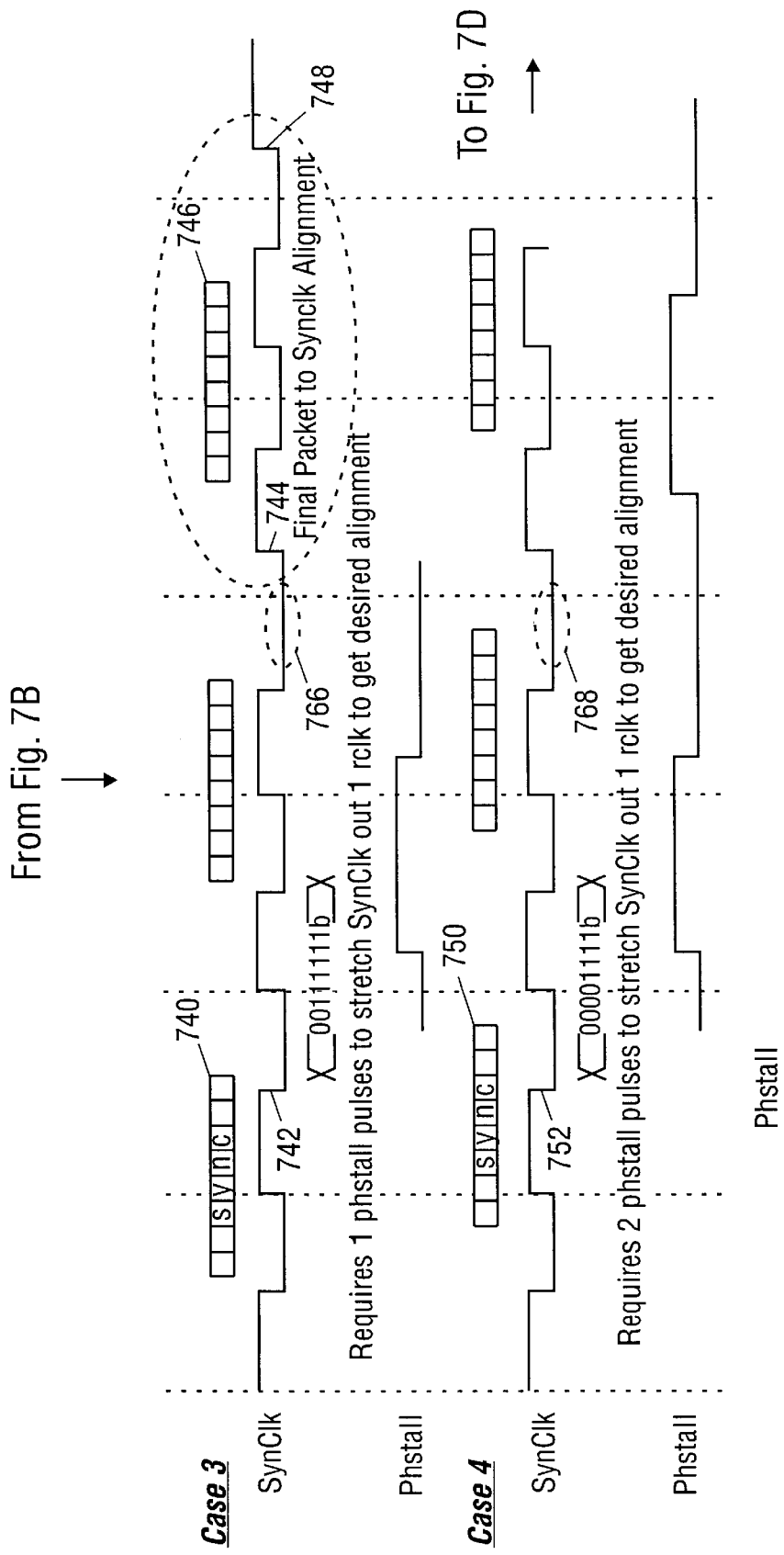
Figure 7D:
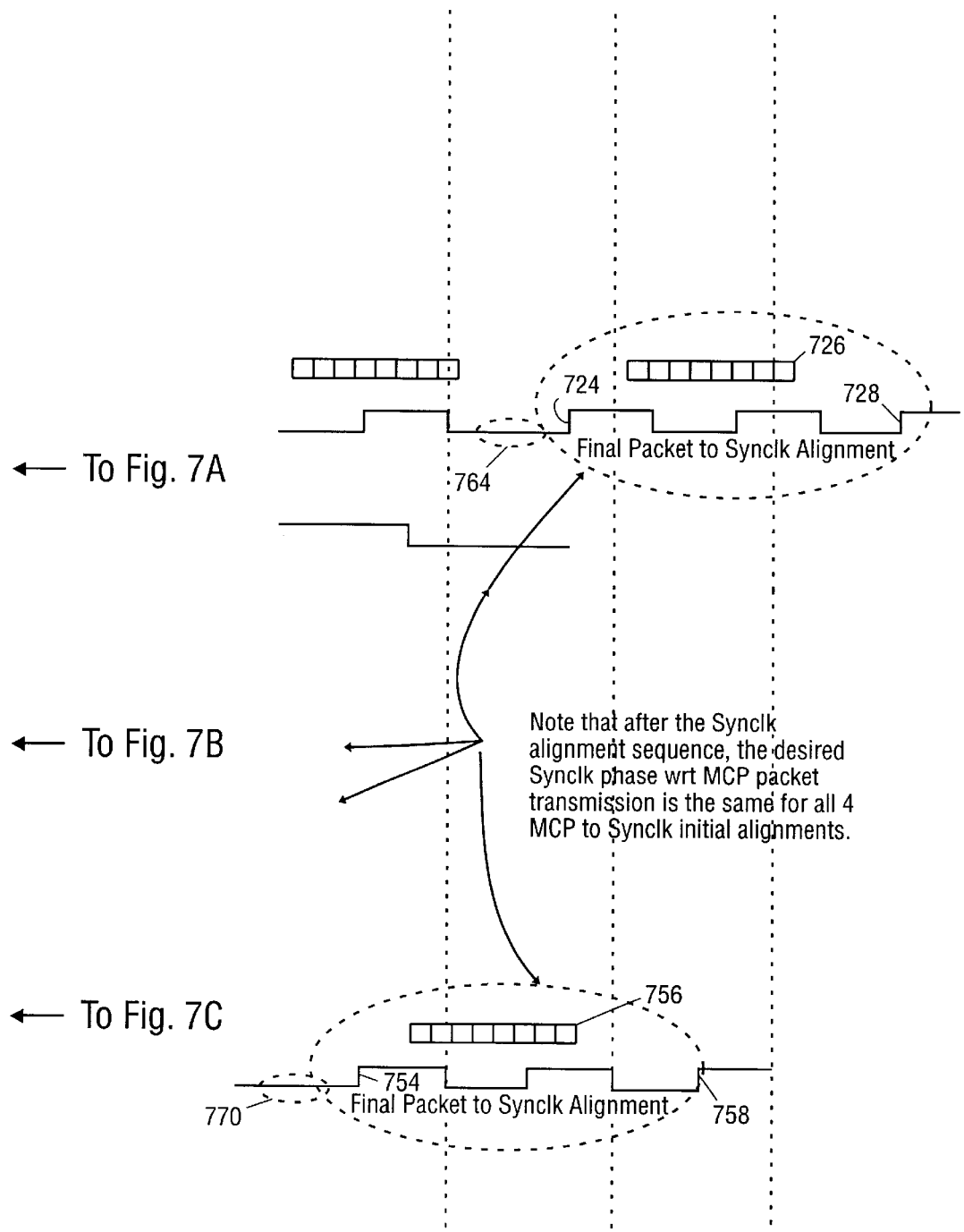

Referring now to FIG. 6, a block diagram of the RAC 510 of the MTH 500 of FIG. 5 is shown, according to one embodiment of the present invention. Data and control information packets arrive from Rambus channel 270 on the DQA lines 250, DQB lines 252, ROW lines 254, and COL lines 256. The packets are decoded in shift registers 610, 620 utilizing a RAC clock, Rclk 640, stabilized by delayed lock loop (DLL) 516, and by Rclk divided by four, Rclk/4 650. In one embodiment, a special synchronizing packet, sync MCP, may consist of all bits being equal to "1".

When memory controller 202 sends sync MCP on the ROW lines 254 or COL lines 256, RAC 510 reads the contents of shift register 620 every clock cycle of Rclk/4 650, and places these contents onto the RQ data lines 520.

When a sync MCP arrives it may not be perfectly framed by Rclk/4 650, so there may be leading or trailing bits equal to "0". The synchronizer 530 of MTH 500 may use the presence of these leading or trailing bits equal to "0" to determine the initial phase relationship of SynClk 522 with FrameClk.

Depending upon which initial phase relationship is determined, synchronizer 530 may issue none, one, two, or three pulses on PhStall 512 line. Each asynchronous pulse on PhStall 512, when combined with Rclk/4 650 in gated shift register 630, causes SynClk 522 to be delayed one CFM 258 clock period. By delaying SynClk 522 an appropriate number of CFM clock periods, in one embodiment SynClk 522 may be placed into the desired phase relationship with respect to FrameClk. In alternate embodiments, SynClk 522 may be placed into the desired phase relationship with alternate framing methods which may be used within memory controller 202. This desired phase relationship may include timing the SynClk rising edges to occur soon after the setup time Tsu for those data packets and control information packets transmitted subsequent to the sync MCP.

Referring now to FIG. 7, a timing diagram of clocks of the MTH 500 of FIG. 5 is shown, according to one embodiment of the present invention. At the top of FIG. 7 is shown the generation of data or control information packets at the memory controller 202. The packets may be sent upon a DQ line (DQA 250 or DQB 252) or upon an RQ line (ROW 254 or COL 256). In general the packets include eight 8-bit bytes. However, in alternate embodiments control packets may include four 8-bit bytes.

In the FIG. 7 embodiment the xSclk 562 clock as generated in FIG. 5 may be used as the CK signal 292 clocks of FIG. 2. SynClk 522 serves as a timing reference input to PLL 550, and therefore SynClk 522 serves as a timing reference for xSclk 562. For this reason it is possible to discuss timing requirements for the DRAM bus 280 in relation to the internal clock SynClk 522 of MTH 500, even though SynClk 522 does not directly time the DRAM bus 280.

In order to meet the timing requirements for receiving packets and sending them out upon DRAM bus 280, as discussed in connection with FIG. 4 above, the receipt of the last byte of a data packet at time 710 should occur no sooner than the setup time prior to the rising edge 712 of SynClk. Not that the RAC shift register 610 sampling takes place at the falling edge of SynClk as indicated at the arrow 712. Because SynClk is synchronized with FrameCLk by CFM, any subsequent data packet will also be received at a time 714 at least a setup time prior to the corresponding rising edge 716 of SynClk.

By examining the contents of the RAC 510 shift registers at each initial transition of Synclk as discussed above in connection with FIG. 5 and FIG. 6, MTH 500 may determine the amount of time necessary to delay SynClk to properly serve as a timing reference for xSclk 562 to clock subsequent data and control information packets onto DRAM bus 280. Four cases are shown in FIG. 7, each case corresponding to one power-on phase relationship between FrameClk and SynClk.

In case 1, a falling edge 722 of SynClk occurs after 4 bytes of a sync MCP packet 720 have entered the shift registers of RAC 510. Based upon reading a pattern of 6 leading "0" bits and 2 received "1" bits, synchronizer 530 issues a series of 3 pulses on PhStall 512 line. Each pulse on PhStall 512 causes a clock period of SynClk to be stretched, at corresponding times 760, 762, and 764. This causes a subsequent rising edge 724 of SynClk to be delayed 3 CFM clock periods (in one embodiment, 7.5 nanoseconds). Subsequent rising edge 728 of SynClk then occurs at the proper time for subsequent packet 726.

In case 2, a falling edge 732 of SynClk occurs after 2 bytes of a sync MCP packet 730 have entered the shift registers of RAC 510. Based upon reading a pattern of no leading "0" bits and 8 received "1" bits, synchronizer 530 issues no pulses on PhStall 512 line. No pulses are necessary because subsequent rising edge 738 of SynClk is already synchronized at the proper time for subsequent packet 736.

In case 3, a falling edge 742 of SynClk occurs after 8 bytes of a sync MCP packet 740 have entered the shift registers of RAC 510. Based upon reading a pattern of 2 leading "0" bits and 6 received "1" bits, synchronizer 530 issues 1 pulse on PhStall. 512 line. The pulse on PhStall 512 causes a clock period to be stretched at time 766. This causes a subsequent rising edge 744 of SynClk to be delayed 1 CFM clock period (in one embodiment, 2.5 nanoseconds). Subsequent rising edge 748 of SynClk then occurs at the proper time for subsequent packet 746.

In case 4, a falling edge 752 of SynClk occurs after 2 bytes of a sync MCP packet 750 have entered the shift registers of RAC 510. Based upon reading a pattern of 4 leading "0" bits and 4 received "1" bits, synchronizer 530 issues 2 pulses on PhStall 512 line. Each pulse on PhStall 512 causes a clock period to be stretched at corresponding times 768 and 770. This causes a subsequent rising edge 754 of SynClk to be delayed 2 CFM clock periods (in one embodiment, 5.0 nanoseconds). Subsequent rising edge 758 of SynClk then occurs at the proper time for subsequent packet 756.

In each case the desired timing of SynClk 522 causes a desired timing of xSclk 562. When SynClk 522 has a stretched clock period, the xSclk 562 output of PLL 550 will temporarily lose synchronization with respect to SynClk 522. However, the PLL 550 will cause this synchronization to quickly recover with xSclk 562 in the desired timing synchronization.

Figure 8:
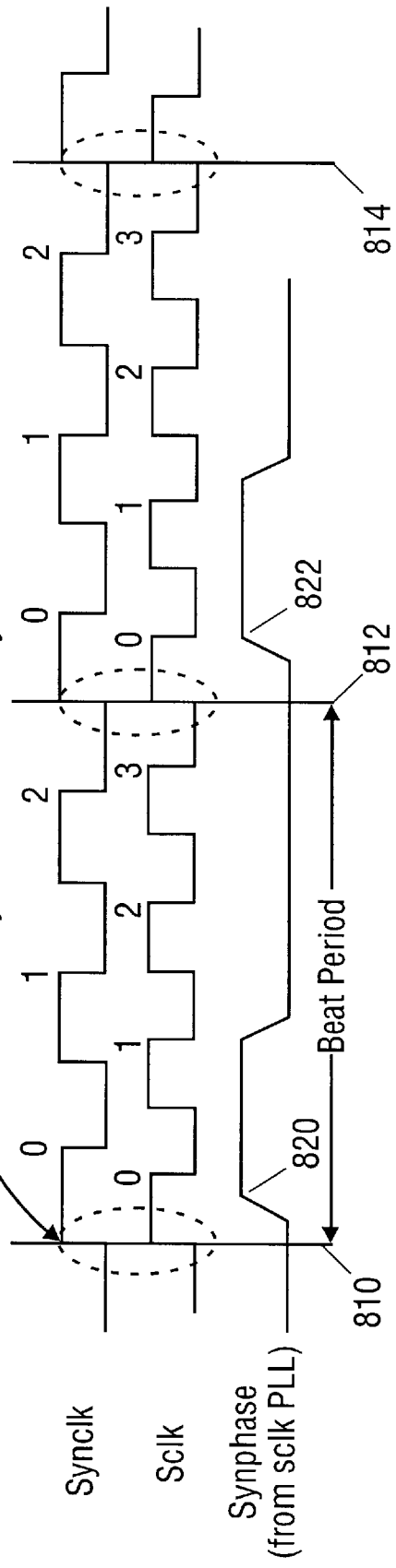
FIG. 8 is a timing diagram of the SynClk and Sclk timings where the clock periods have an integral ratio, according to one embodiment of the present invention.
Figure 9A:
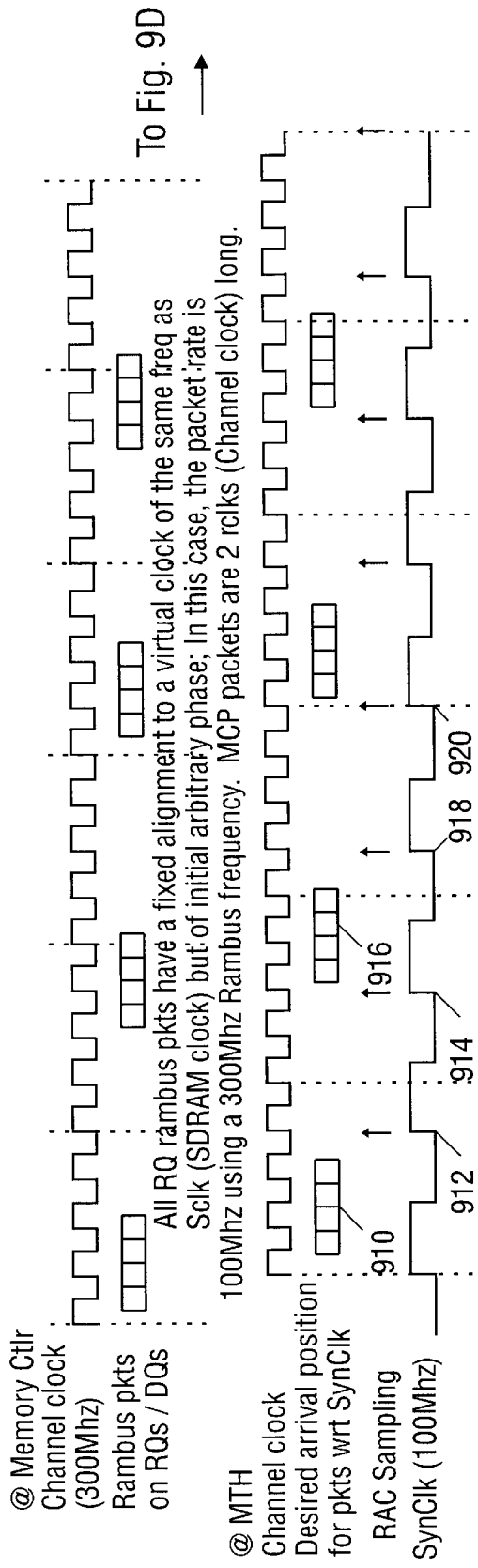
FIG. 9 is a timing diagram of the clocks of the MTH of FIG. 2, according to an alternate embodiment of the present invention.
Figure 9B:
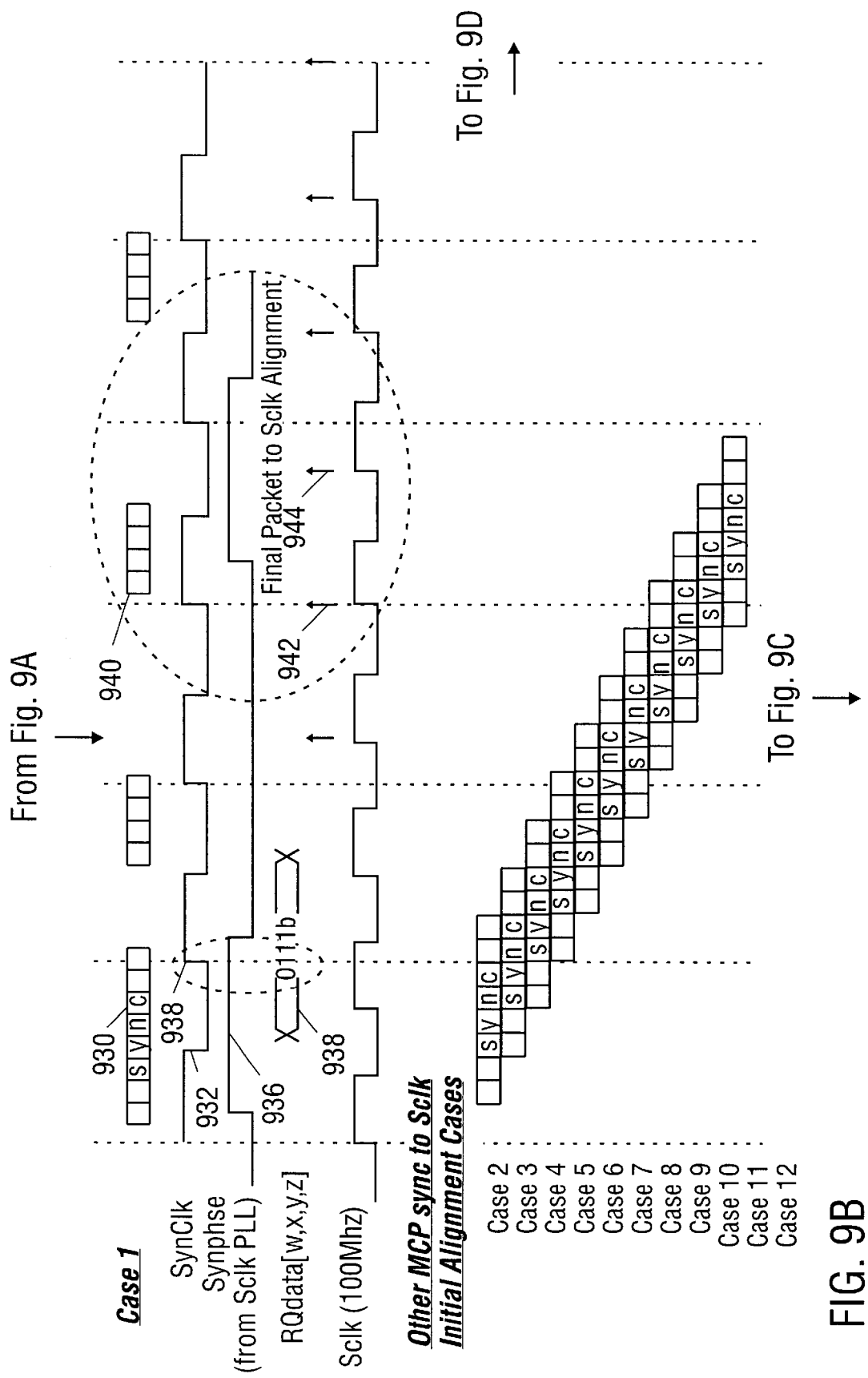
Figure 9C:
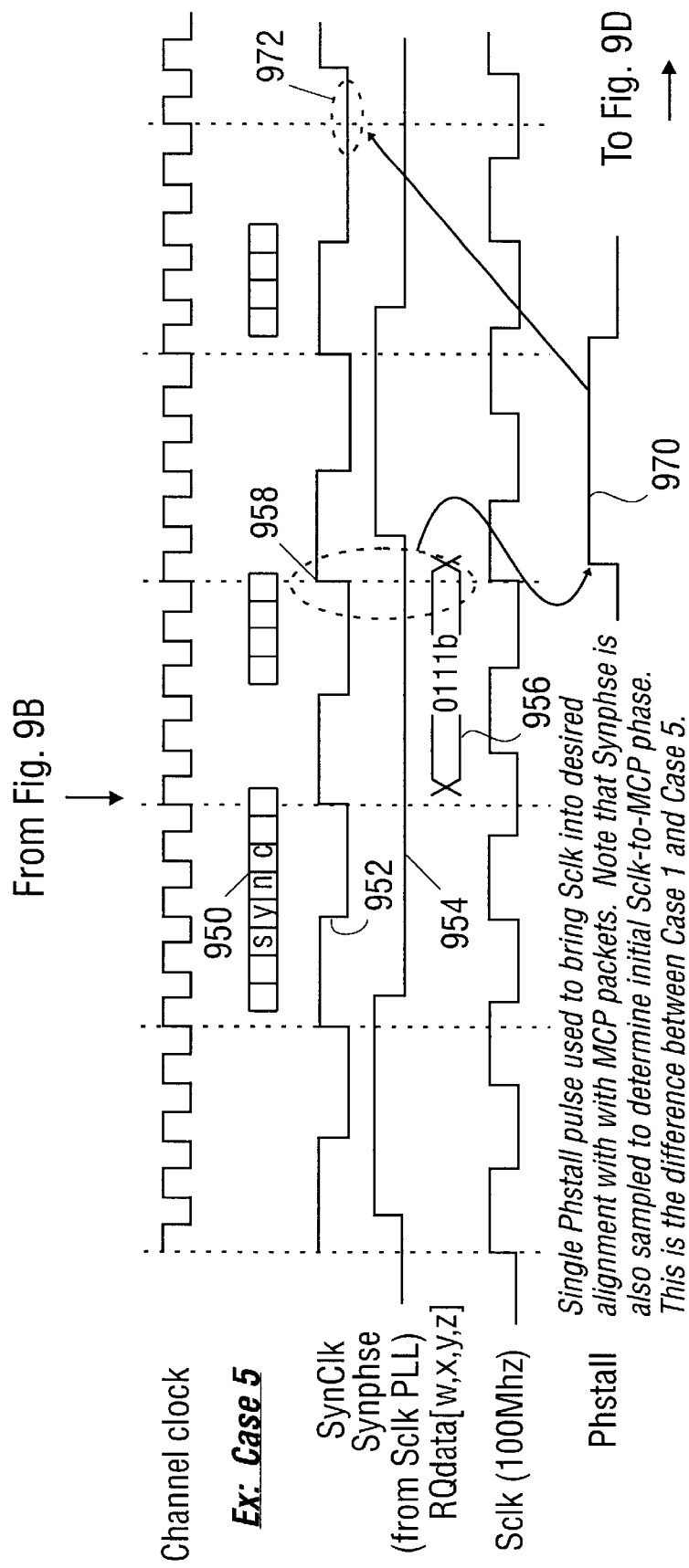
Figure 9D:
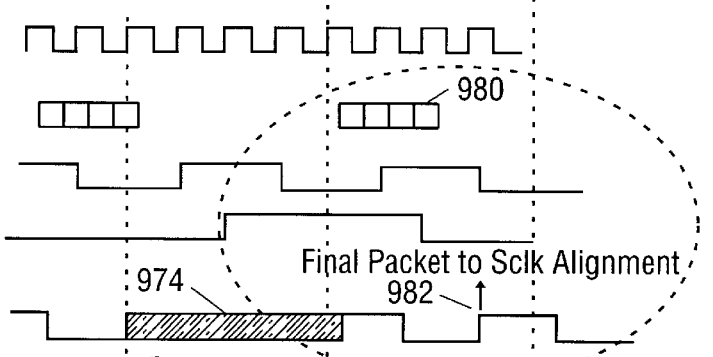

FIG. 8 is a timing diagram of the SynClk and Sclk timings where the clock periods have an integral ratio, according to one embodiment of the present invention. In previous exemplary embodiments, it was assumed that the Rambus channel operated with a 400 MHz clock and the DRAM bus operated with a 100 MHz clock. In other embodiments, other clock frequencies are envisioned, included among them a Rambus channel with either a 400 MHz or 300 MHz clock, and a DRAM bus with either a 100 MHz or 133 MHz clock.

The PLL circuit 550 of MTH 500 includes circuitry designed to accommodate Rambus channels with a 4N MHz clock and a DRAM bus with an M MHz clock, where M/N is a rational number but where M and N are not simple multiples of one another. In the FIG. 8 example, the Rambus channel has a 300 MHz clock so N=75, and the DRAM bus has a 100 MHz clock so M=100. For this embodiment, dividers 548, 558 are divide-by-4 and divide-by-3 dividers, respectively. For other embodiments, other dividers could be used. Multiplexors 554, 556 select the "A" inputs for this situation, allowing PLL 552 to synchronize the non-equal frequency clocks. The Synphse 566 signal from multiplexor 556 contains beat frequency timing for use in the RAC timing control 540. Synphse 566 rising edges 820, 822 indicate times 810, 812, respectively, when SynClk and Sclk are synchronized in the SynClk time domain.

FIG. 9 is a timing diagram of the clocks of the MTH of FIG. 2, according to an alternate embodiment of the present invention. In the FIG. 9 embodiment, SynClk 522 and Sclk 564 are in the timing relationship of FIG. 8. With these timing relationships there are 12 possible cases of initial alignment of sync MCP with Sclk 564. Note that, unlike the simpler case of FIG. 7 where the SynClk and Sclk have the same frequency, the time of RAC shift register sampling is not tied to an edge of SynClk 522. Again the MCP packets are generated in reference to a frame clock FrameClk in the memory controller. In this embodiment, Sclk 564 has the same frequency as FrameClk, but Sclk 564 has an arbitrary initial phase with respect to FrameClk. For this reason Sclk 564 must be synchronized with the incoming MCP packets.

A target condition in the FIG. 9 embodiment is to sample the RAC shift registers for an MCP packet on alternate rising edges of Sclk 564. For example, MCP packet 910 is sampled at time 912, and MCP packet 916 is sampled at time 918. Times 912 and 918 correspond to alternate rising edges of Sclk 564 where RAC sampling is not indicated.

In order to align Sclk 564 for proper RQ data packet sampling, the RAC shift register 620 is initially sampled at every falling edge of SynClk 522. When a non-empty RQ data field results, this indicates that a sync MCP packet has been received. As in the FIG. 7 example, the contents sampled give indications of the phase relationship of SynClk 522 with respect to Sclk 564.

In the case 1 example, sync MCP 930 is sampled by falling edge 932 of SynClk 522. The resulting data 938, when combined with the simultaneous rising edge 938 of SynClk 522 and positive state 936 of Synphse 566, indicates that subsequent MCP packets will be in phase with Sclk 564. As an example, the fourth rising edge 944 of Sclk after the capture of the sync MCP 930 will time the reading of MCP packet 940. The RAC timing control 540 may determine the even numbered rising edges of Sclk 564 by a counter or by dividing Sclk by 2. This prevents sampling on alternate rising edges such as rising edge 942. In other embodiments, the sampling edges may be every third or more rising edges of Sclk 564.

In the case 5 example, Sclk 564 is not initially synchronized with sync MCP 950. When sync MCP 950 is sampled at falling edge 952 of SynClk 522, the resulting data 956, when combined with the information conveyed by the simultaneous rising edge 958 of SynClk 522 and negative state 954 of Synphse 566, indicates that subsequent MCP packets will not be in phase with Sclk 564. Again, as in the FIG. 7 example, the resulting data 956 give information on how much out of phase Sclk 564 is with respect to sync MCP 950. In the case 5 example, delaying SynClk 522 one clock period of CFM 514 will cause proper alignment of Sclk 564. Again, as in the FIG. 7 example, PhStall 512 is pulsed in order to stretch out a period of SynClk 522. In the case 5 example, one pulse 970 on PhStall 512 causes SynClk 522 to stretch out at time 972. This stretching of the SynClk 522 time period causes PLL circuit 550 to lose phase lock for a short time period 974, after which the next rising edge 982 of Sclk 564 is in proper alignment to sample MCP packet 980. Similar phase adjustments may be performed in the case 2 through case 4 and case 6 through case 12 examples of FIG. 9.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
   a memory controller to connect with a first memory bus and to send a reference clock and a synchronizing packet; and
   a memory hub connecting said first memory bus and a second memory bus, including an input for said reference clock, and a generating circuit to generate a synchronizing clock and to determine a phase of said synchronizing clock responsive to receiving said synchronizing packet on said first memory bus.

2. The system of claim 1, wherein said generating circuit includes a delaying circuit configured to delay said synchronizing circuit in response to said synchronizing packet.

3. The system of claim 2, wherein said memory hub receives said synchronizing packet in response to said synchronizing clock.

4. The system of claim 2, wherein said delaying circuit delays a period of said reference clock.

5. The system of claim 2, wherein said memory hub sends pulses to said delaying circuit.

6. The system of claim 5, wherein said pulses induce said delaying circuit to delay said synchronizing clock a period of said reference clock.

7. The system of claim 1, wherein said memory hub may receive partial packets of said synchronizing packets.

8. The system of claim 7, wherein said generating circuit delays said synchronizing clock in response to said partial packets.

9. The system of claim 7, wherein said generating circuit delays said synchronizing clock a number of periods of said reference clock in response to data of said partial packets.

10. A method of synchronizing a second memory bus with a first memory bus, comprising:
    sending a reference clock to a memory hub connecting said first memory bus and said second memory bus;
    sending a synchronizing packet to said memory hub prior to sending data packets or address packets;
    generating a synchronizing clock within said memory hub utilizing said reference clock;
    determining a phase of synchronizing timing by receiving said synchronizing packet with said synchronizing clock, and
    adjusting said synchronizing clock to said phase responsive to said synchronizing packet.

11. The method of claim 10 further comprising delaying said synchronizing clock in response to said synchronizing timing.

12. The method of claim 11 wherein said delaying includes pulsing a delaying circuit.

13. The method of claim 11 wherein said delaying includes delaying a period of said reference clock.

14. The method of claim 11 wherein said delaying includes stretching said reference clock.

15. The method of claim 14 wherein said stretching delays said synchronizing clock a period of said reference clock.

16. An apparatus for synchronizing a
    second memory bus with a first memory bus, comprising:
    means for sending a reference clock to a memory hub connecting said first memory bus and said second memory bus;
    means for sending a synchronizing packet to said memory hub prior to sending data packets or address packets;
    means for generating a synchronizing clock within said memory hub utilizing said reference clock;

means for determining a phase of synchronizing timing by receiving said synchronizing packet with said synchronizing clock, and means for adjusting said synchronizing clock to said phase responsive to said synchronizing packet.

17. A circuit for synchronizing a second memory bus with a first memory bus, comprising:
- a memory hub connecting said first memory bus and said second memory bus;
- an input for a reference clock of said memory hub and coupled to said first memory bus;
- a generating circuit of said memory hub configured to generate a synchronizing clock, and to determine a phase of said synchronizing clock responsive to a synchronizing packet on said first memory bus, coupled to said reference clock and to said second memory bus; and
- a receiver for said synchronizing packet coupled to said first memory bus.

18. The circuit of claim 17, wherein said generating circuit includes a delaying circuit configured to delay said synchronizing circuit in response to said synchronizing packet.

19. The circuit of claim 18, wherein said receiver receives said synchronizing packet in response to said synchronizing clock.

20. The circuit of claim 18, wherein said delaying circuit delays a period of said reference clock.

21. The circuit of claim 18, wherein said receiver sends pulses to said delaying circuit.

22. The circuit of claim 21, wherein said pulses induce said delaying circuit to delay said synchronizing clock a period of said reference clock.

23. The circuit of claim 17, wherein said receiver may receive partial packets of said synchronizing packets.

24. The circuit of claim 23, wherein said generating circuit delays said synchronizing clock in response to said partial packets.

25. The circuit of claim 23, wherein said generating circuit delays said synchronizing clock a number of periods of said reference clock in response to data of said partial packets.

* * * * *